(12) United States Patent
Hulsey

(10) Patent No.: US 8,977,084 B2
(45) Date of Patent: Mar. 10, 2015

(54) OPTICAL ANTENNA AND METHODS FOR OPTICAL BEAM STEERING

(75) Inventor: Daniel Eric Hulsey, Florissant, MO (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 13/554,907

(22) Filed: Jul. 20, 2012

(65) Prior Publication Data

US 2014/0023318 A1    Jan. 23, 2014

(51) Int. Cl.
*G02B 6/26* (2006.01)
*G02B 6/34* (2006.01)
*G02B 6/42* (2006.01)

(52) U.S. Cl.
USPC .............................................. 385/37; 385/50

(58) Field of Classification Search
USPC ..................................... 385/37, 50
See application file for complete search history.

(56) References Cited

U.S. PATENT DOCUMENTS

| | | | |
|---|---|---|---|
| 4,776,661 A | 10/1988 | Handa | |
| 5,652,596 A | 7/1997 | Abrams et al. | |
| 5,832,156 A * | 11/1998 | Strasser et al. | 385/48 |
| 5,982,334 A | 11/1999 | Manasson et al. | |
| 7,042,420 B2 | 5/2006 | Ebling et al. | |
| 7,230,227 B2 | 6/2007 | Wilcken et al. | |
| 7,375,696 B2 | 5/2008 | Sato et al. | |
| 7,382,535 B2 | 6/2008 | Hulsey | |
| 7,421,163 B1 | 9/2008 | Tong et al. | |
| 7,667,660 B2 | 2/2010 | Manasson et al. | |
| 7,689,076 B1 | 3/2010 | Balestra | |
| 7,872,812 B2 | 1/2011 | Bowers et al. | |
| 8,058,935 B2 | 11/2011 | Lynch et al. | |
| 2004/0136654 A1 * | 7/2004 | Takushima et al. | 385/37 |
| 2008/0107378 A9 * | 5/2008 | Schilling | 385/37 |
| 2008/0192173 A1 | 8/2008 | Itoh et al. | |
| 2011/0274438 A1 * | 11/2011 | Fiorentino et al. | 398/141 |
| 2011/0298680 A1 | 12/2011 | Shylo et al. | |
| 2012/0062411 A1 | 3/2012 | Shylo et al. | |

FOREIGN PATENT DOCUMENTS

GB      1 397 467 A    6/1975

OTHER PUBLICATIONS

D. Mehuys, et al., Characteristics of Multistage Monolithically Integrated Master Oscillator Power Amplifiers, IEEE Journal of Quantum Electronics, vol. 27, No. 6, Jun. 1991, 1574-1581.
N. Eriksson, et al., Highly Efficient Grating-Coupled Surface-Emitters With Single Outcoupling Elements, IEEE Photonics Technology Letters, vol. 7, No. 12, Dec. 1995, 1394-1396.
R. Roncone, et al., Design and Fabrication of a Single Leakage-Channel Grating Coupler, Applied Optics, vol. 32, No. 24, Aug. 20, 1993, 4522-4528.

(Continued)

*Primary Examiner* — Jerry Blevins
(74) *Attorney, Agent, or Firm* — Joseph M. Butscher; The Small Patent Law Group LLC

(57) ABSTRACT

An optical antenna and methods for optical beam steering are provided. One optical planar antenna includes a linear waveguide within a substrate and having a fiber interface. The optical planar antenna also includes a planar waveguide within the substrate, a first diffractive optical element configured to couple the linear waveguide to the planar waveguide and a second diffractive optical element configured to couple the planar waveguide to free space.

19 Claims, 2 Drawing Sheets

(56) References Cited

OTHER PUBLICATIONS

D. Mehuys, et al., Analysis of Detuned Second-Order Grating Output Couplers With an Intgrated Superlattice Reflector, IEEE Photonics Technology Letters, vol. 3, No. 4, Apr. 1991, 342-344.

M. Heino, Fiber Optic High Voltage Probe, This work was supported by Dept. of Energy Contract #DE-AC-08-96NV11718 and was performed at The Lawrence Livermore Nat'l Laboratory in Livermore, CA, heino1@lln1.gov, 3 pgs.

http://en.wikipedia.org/wiki/Blue_Phase_Mode_LCD, Blue Phase Mode LCD, 4 pgs.

H. Coles, et al., Liquid Crystal 'Blue Phases' With a Wide Temperature Range, Nature, vol. 436, Aug. 18, 2005, doi:10,1038/nature03932, 997-1000.

Z. Ge, et al., Electro-Optics of Polymer-Stabilized Blue Phase Liquid Crystal Displays, Applied Physics Letters 94, 101104 (2009), 3 pgs.

P. Etchegoin, Blue Phases of Cholesteric Liquid Crystals as Thermotropic Photonic Crystals, Physical Review E, vol. 62, No. 1, Jul. 2000, 1435-1438.

J.S. Patel, Flexoelectric Electro-Optics of a Cholesteric Liquid Crystal, Physical Review Letters, vol. 58, No. 15, Apr. 13, 1987, 1538-1540.

H.J. Coles, et al., Strong Flexoelectric Behavior in Bimesogenic Liquid Crystals, Journal of Applied Physics 99, 034104 (2006), 5 pgs.

Extended European Search Report, Application No. 131739831-1504, Ref. No. NAM/P127340EP00, Dated: Dec. 11, 2013, (6) pgs.

* cited by examiner

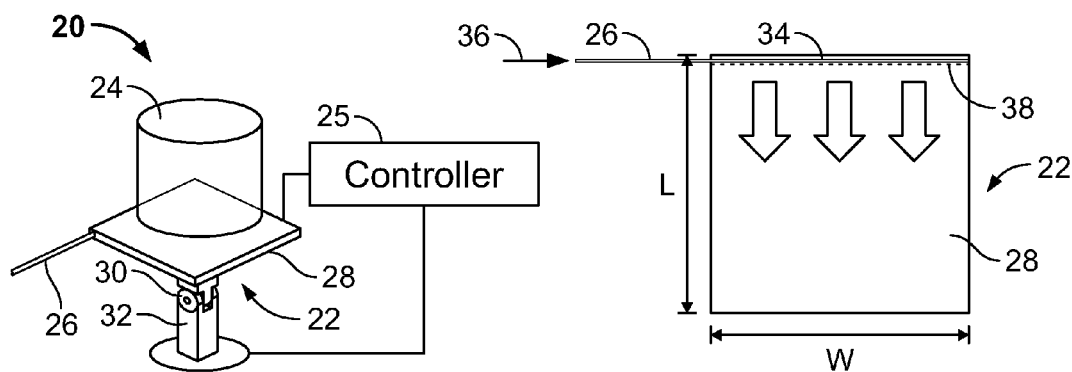
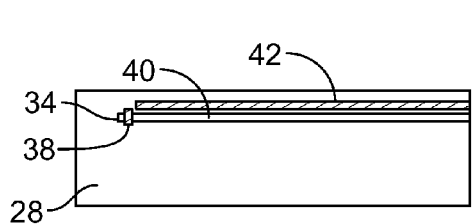
FIG. 3
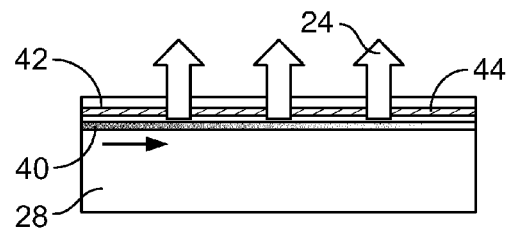
FIG. 4
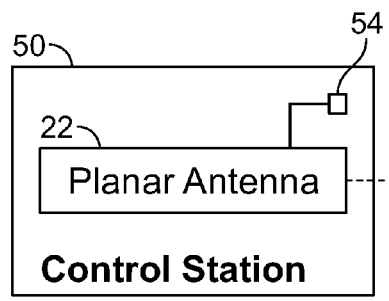
FIG. 5

OPTICAL ANTENNA AND METHODS FOR OPTICAL BEAM STEERING

BACKGROUND

The present disclosure relates generally to optical systems, particularly optical antennas.

In many optical systems, the optical interface is an aperture designed to transmit and/or receive light over a range of angles. These systems generally contain a large volume of optical components for beam shaping and steering in order to create that interface. For example, a number of optical elements are provided in a chained arrangement having a large beam path to control beam steering. As a result, the size, weight and/or complexity of these systems increase.

In known laser communication terminals, such as for spacecraft and aircraft applications, the optical antenna head may be large and can be heavy (e.g., over 100 pounds) as a result of the number of optical elements used. This added size and weight can have a large integration impact on the host platform, for example, affecting size, weight and power (SWaP) requirements.

SUMMARY

In accordance with one embodiment, an optical planar antenna is provided that includes a linear waveguide within a substrate and having a fiber interface. The optical planar antenna also includes a planar waveguide within the substrate, a first diffractive optical element configured to couple the linear waveguide to the planar waveguide and a second diffractive optical element configured to couple the planar waveguide to free space.

In accordance with another embodiment, a method for transmitting an optical signal is provided. The method includes coupling a fiber to a one-dimensional waveguide within an optical substrate, wherein the fiber is configured to carry an optical signal. The method also includes configuring the one-dimensional waveguide to carry the optical signal along an axis of the optical substrate to generate a one-dimensional optical signal and coupling the one-dimensional optical signal to a planar waveguide of the optical substrate to generate a two-dimensional optical signal along two axes of the optical substrate. The method further includes coupling the two-dimensional optical signal to free space.

In accordance with another embodiment, an optical head for a laser communication system is provided that includes an optical planar antenna as described above. The optical head also includes a pivoting support mounted to the optical planar antenna configured to pivot the optical planar antenna.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 1 is an illustration of an optical head having a planar antenna in accordance with one embodiment.

FIG. 2 is a schematic illustration of a planar antenna in accordance with one embodiment.

FIG. 3 is another schematic illustration of a planar antenna in accordance with one embodiment.

FIG. 4 is another schematic illustration of a planar antenna in accordance with one embodiment.

FIG. 5 is a block diagram illustration of a communication system having antennas in accordance with one embodiment.

DETAILED DESCRIPTION

Figure 6:
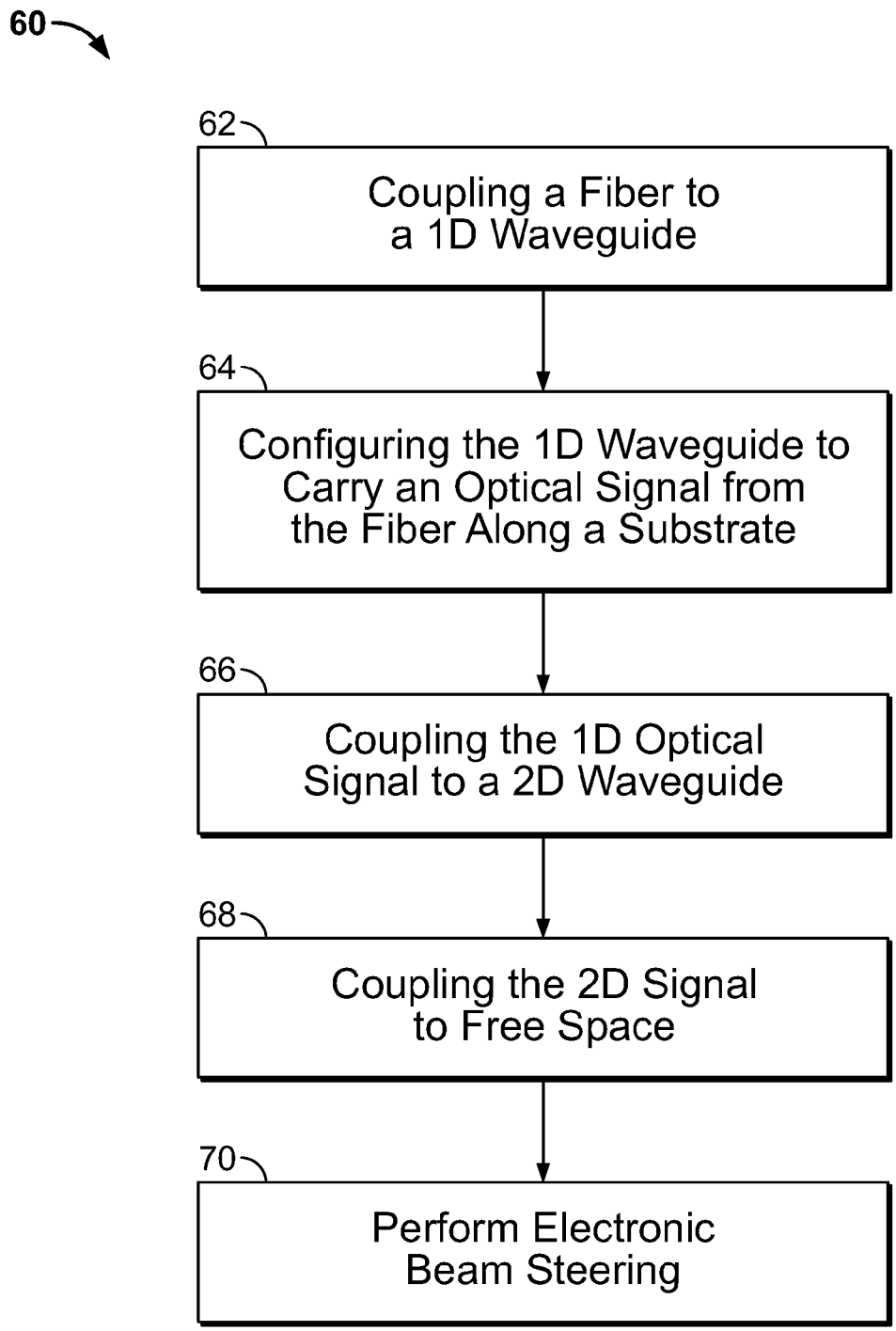
FIG. 6 is an illustration of operations performed by one embodiment to transmit an optical signal.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide a planar optical antenna that performs beam expansion and/or collimation, as well as beam steering functions in a planar waveguide structure. The antenna arrangement in various embodiments may have a shorter beam path wherein signals are converted between a fiber mode and a free space beam. The various embodiments may be used, for example, in the optical head or antenna for a laser communication terminal, which may include land, air, sea and space applications. For example, the various embodiments may be used as a compact fiber collimator for an optical bench, a surface mount antenna for tactical links, an antenna for inter-satellite links or elements of an optical phased array antenna, among others.

In various embodiments, an optical head 20 (e.g., optical laser communication head) may be provided as illustrated in FIG. 1 showing a planar antenna structure that converts signals in a fiber mode to a free space beam. In particular, in various embodiments, a planar antenna 22 is provided that uses optical waveguide technologies along with diffractive optical elements to provide an interface between a single mode optical fiber 26 coupled to the planar antenna 22 (to define a fiber interface) and a free space beam 24, illustrated as a laser beam that is being expanded and collimated, and which also may be steered, in various embodiments. For example, as described in more detail herein, structures on a glass substrate 28 of the planar antenna 22 perform beam expanding, collimating and steering functions of the optical head 20, which may be controlled by a controller 25.

The optical head 20 may include means to move (e.g., tilt or swivel) the planar antenna 22, which also may be controlled by the controller 25 or a separate controller (not shown). For example, a pivoting support 30, such as one or more gimbals are coupled to the planar antenna 22, which in the illustrated embodiment is provided via a post 32 or other support or arm structure. It should be noted that the pivoting support 30 may be located higher or lower along the post 32. It also should be noted that although the pivoting support 30 is illustrated as a one-axis gimbal, a multi-axis gimbal (e.g., a two-axis gimbal) may be provided. However, it should be appreciated that different types of pivoting devices may be used instead of or in addition to a gimbal.

In operation in some embodiments, the planar antenna 22 utilizes dynamic diffraction gratings to couple light out of one or more waveguides, which allows multiple axes of beam steering that may be controlled using a single voltage. For example, FIG. 2 illustrates a top view of the planar antenna 22 showing the single mode fiber 26 coupled to a linear waveguide 34 within the glass substrate 28. For example, the waveguide 34 in the illustrated embodiment is a linear (one-dimensional (1D)) waveguide in the glass substrate 28 that carries a beam 36 (e.g., a laser light beam) received from the single mode fiber 26 along one axis, illustrated as the width (W), of the glass substrate 28.

The optical waveguide 34 may be formed within, on or along the glass substrate 28 using different techniques known in the art. For example, an optical fiber may be provided within the glass substrate 28 (e.g., forming the glass substrate 28 around an optical fiber) in some embodiments. In other embodiments, a channel or bore may be formed within the glass substrate 28, which may be hollow (e.g., hollow tube with a highly reflective inner surface) or filled with a material having a different index of refraction than the glass substrate 28. It should be noted that in some embodiments different substrate materials may be used instead of glass. The optical waveguide 34 is any type of waveguide that operates at optical frequencies, and in various embodiments, is a dielectric waveguide, including a structure in which a dielectric material having a high permittivity, and thus a high index of refraction, is surrounded by a material with lower permittivity (e.g., glass in the illustrated embodiment). In operation, the optical waveguide 34 guides optical waves from the single mode fiber 26 by internal reflection.

The optical waveguide 34 may be any type of waveguide that guides the light from the single mode fiber 26 in the glass substrate 28 along a line. It should be noted that different types of materials may be used to form the optical waveguide 34, such as a photonic-crystal fiber.

Thus, in various embodiments, the optical waveguide 34 constrains the light therein in two axes, such that the light moves within the glass substrate 28 along the third axis, which in the illustrated embodiment is across the width (W) of the glass substrate 28.

The glass substrate 28 also includes a first diffractive optical element, illustrated as a diffraction grating 38 along the width (W) of the glass substrate 28 and adjacent the optical waveguide 34. The diffraction grating 38 couples the light from within optical waveguide 34 to a planar waveguide along the length (L) of the glass substrate 28 as illustrated by the arrows in FIG. 2 (shown as coupling the light or one-dimensional optical signal from the top to bottom of the glass substrate 28 as viewed in FIG. 2). In various embodiments, the diffraction grating 38 gradually couples the light out from the optical waveguide 34.

In various embodiments, the diffraction grating 38 is formed by an arrangement or structure within the glass substrate 28 that creates a periodic disturbance (e.g., a sine wave) within the glass substrate 28, such as a modulation in the index of refraction. The diffraction grating 38 may be any type of optical component with a periodic structure, which splits and diffracts light into several beams traveling in different directions. It should be noted that the directions of these beams depend on the spacing of the grating and the wavelength of the light so that the grating acts as the dispersive element.

In some embodiments, the diffraction grating 38 creates a modulation in the absorption of the material through which the light passes, such as in constructive or destructive interference patterns that causes the light to propagate in a different direction, which in the illustrated embodiment is along the length (L) of glass substrate 28. The diffraction may be in a direction perpendicular to the optical waveguide 34 or at angle thereto. For example, in various embodiments, a change in frequency changes the angle of diffraction. In one embodiment, the frequency is selected to cause the light to diffract at ninety degrees or perpendicular to the optical waveguide 34. The frequency may be changed by the spacing of the disturbances in glass substrate 28 represented by the dots of the diffraction grating 38, which may be a periodic change in the index of refraction caused by a different material within the glass substrate 28 spaced along the width (W) of the glass substrate 28 adjacent the optical waveguide 34.

Variations are contemplated for causing the diffraction. For example, an acoustic wave with a periodic index change may be used to thereby create the diffraction grating 38. In other embodiments, the frequency or period of the disturbances (represented by the dots) also may be changed in different ways. In one embodiment, a dynamic material may be used wherein the voltage and/or current applied changes (e.g., stretches or compresses) the periodicity of the disturbances along the width (W). In still other embodiments, a liquid crystal may be used that reorients the disturbances to change the angle of diffraction. The diffraction grating 38 operates to extract or couple the light traveling within the optical waveguide 34 out of the optical waveguide 34 and along the length (L) of the glass substrate 28.

Thus, the diffraction grating 38 in some embodiments may be disturbances formed within the glass substrate 28 or caused within glass substrate 28, such as from an external source.

As shown in FIG. 3, illustrating a side view of the glass substrate 28, the diffraction grating 38 adjacent to the optical waveguide 34 gradually couples the light out of the optical waveguide 34 into a planar (two-dimensional) optical waveguide 40. The optical waveguide 40 is formed to constrain the diffracted light from the diffraction grating 38 in the plane of the glass substrate 28, such that if the glass substrate 28 is in a horizontal orientation, the light is constrained vertically and not horizontally. In some embodiments, the optical waveguide 40 is formed to give a collimated guided wave (e.g., a two-dimensional optical signal) that is approximately the width (W) of the glass substrate 28. However, in other embodiments, the optical waveguide 40 may be formed such that the collimated guided wave is less than the width (W) of the glass substrate 28. It should be noted that the optical waveguide 40 may be formed using different methods, such as similar to the formation of the optical waveguide 34 discussed in more detail above. For example, the optical waveguide 40 may be a space within the glass substrate 28 or a plane of different material within the glass substrate 28.

Thus, in operation, the single mode fiber 26 couples the light into the optical waveguide 34 that carries the light along a linear path across the width (W) of the glass substrate 28. The diffraction grating 38 adjacent to the optical waveguide 34 gradually couples the light beam out into the optical waveguide 40, which in one embodiment results in a collimated guided light wave that is approximately the width (W) of the glass substrate 28. In the illustrated embodiment, a second diffractive optical element illustrated as another diffraction grating 42 is provided adjacent to the optical waveguide 40. The diffraction grating 42 may be formed using different methods, such as similar to the formation of the diffraction grating 38 discussed in more detail above. As the light wave travels along the length (L) of the glass substrate 28 guided by the optical waveguide 40, the diffraction grating 42 gradually couples the light out into free space as the free space beam 24 (shown in FIG. 1). The free space beam 24 may be, for example, a collimated beam from approximately the entire surface area of the glass substrate 28. However, different sizes of free space beams 24 may be formed, which may encompass less than the entire surface area of the glass substrate 28. In some embodiments, multiple free space beams 24 may be formed and collimated concurrently.

In various embodiments, the diffraction grating 42 gradually couples the light into free space as the light wave decays as the wave is coupled into free space when traveling along the optical waveguide 40 (illustrated by the arrow in FIG. 4). Accordingly, in various embodiments, the diffraction grating 42 is formed such that there is a coupling ratio that increases along the travel direction of the optical waveguide 40, for example, having a higher coupling ratio at an end 44 of the diffraction grating 42 than at the beginning of the diffraction grating 42. For example, the amplitude of the index of refraction modulation forming the diffraction grating 42 may be changed along the travel path of the light wave such that the coupling ratio incrementally increases from left to right as viewed in FIG. 4. However, the increase in coupling ratio may increase in different increments or continuously. In some embodiments, the coupling ratio increases as a function of the wave decay of the light wave. Also, in some embodiments, the distance between the optical waveguide 40 and the diffraction grating 42 may be varied to change the coupling ratio. Thus, the light wave coupled out of the optical waveguide 40 may be maintained uniform or given any desired profile in various embodiments.

It should be noted that although the free space beam 24 is shown as coupled upward in FIG. 4, the free space beam 24 may be coupled downward.

In various embodiments, the diffraction grating 38 and the diffraction grating 42 are both configured to vary the amount of beam coupling along the length of the grating to compensate for the decay in optical power in the optical waveguides 34 and 40, respectively, due to the power transfer. Accordingly, the coupling is weaker at an input side of the optical waveguides 34 and 40 and is stronger at the opposite end (down the travel path) of the optical waveguides 34 and 40. Additionally, at least one of the optical waveguides 34 and 40 may be formed from a material different than the substrate 28. In one embodiment, at least one of the optical waveguides 34 and 40 is formed from an electro-optic material In general, when using diffraction gratings to couple light from a planar waveguide, the grating, before detuning, has a period of λ/n, where λ is the optical wavelength and n is the effective index of refraction of the waveguide, which results in a first-order diffracted wave perpendicular to the substrate and a second-order diffraction returned as a reflection back down the waveguide.

In various embodiments, the second-order reflection is suppressed. For example, the grating period may be detuned, which gives an output beam a little off perpendicular to the glass substrate 28. Another example is to make the grating, for example the modulation of the diffraction grating 42, with a sine wave profile instead of square wave, as the harmonics of the grating shape causes the higher diffraction orders.

It also should be noted that a two-dimensional grating, such as the diffraction grating 42 along a waveguide gives first order diffracted beams in both directions (up and down) perpendicular to the glass substrate 28. Various embodiments are configured to provide a single output. For example, blazed gratings, three-dimensional volume holograms with tilted planes of higher index, or a high reflector (e.g., multilayer dielectric) can be included to return the unwanted diffraction order back to the diffraction grating 42 to be combined with the main output. It further should be noted that the phase of the returned beam (controlled by the distance to the reflector) determines how much the light contributes to the output beam and how much to the waveguide modes.

It should be noted that one or both of the diffraction gratings 38 and 42 may be configured to minimize a diffraction efficiency of a second diffraction order via one of sine wave grating, blazed grating, or volume grating. Additionally, one or both of the diffraction gratings 38 and 42 may be configured to minimize one of the first diffraction orders via blazed grating, volume grating, or associated reflective layers.

When using a high reflector parallel to the waveguide (e.g., the optical waveguide 40) to create a single output beam, an alternate embodiment includes providing the reflector above the diffraction grating 42 and directing the output beam through the glass substrate 28. This configuration also provides some isolation between the optical waveguide 40 and the reflective layers. In other embodiments, a layer of metallization may be provided directly on top of the diffraction grating 42 to provide the isolated reflector.

In operation, beam steering may be accomplished in one or more embodiments by changing the effective grating period of one or both of the diffraction gratings 38 and 42. For example, in the orientation of the glass substrate 28 shown in FIG. 2, the diffraction grating 38 (which is a one-dimensional grating) steers the light beam in the azimuth direction and the diffraction grating 42 (which is a two-dimensional grating) steers the light beam in the elevation direction.

In various embodiments, the effective grating period is changed by changing or varying a single parameter for each axis. For example, in some embodiments, an applied voltage to each of the diffraction gratings 38 and 42 is changed to change the effective grating period of each, such as by changing the physical structure of the grating using an electrostrictive effect. In other embodiments, the index of refraction of the waveguides 34 and 40 may be changed along a fixed grating.

Various methods of beam steering may be provided. For example, some embodiments provide beam steering (with an output coupler) by modulating the effective index of refraction of the optical waveguide 40. The angle in air, θ, of the output beam from normal to the surface is given by the equation:

$$\sin(\theta) = n - \frac{\lambda}{\Lambda} \qquad \text{Eq. 1}$$

where n is the effective refractive index of the waveguide, λ is the wavelength of light, and Λ is the grating period.

In operation, to determine an amount of index variation, if the beam angle is to be changed by 1° and the nominal output angle is perpendicular to the substrate, the change in effective index is sin(1°)=0.0175. If the nominal output angle is 45° from perpendicular, the change in effective index for the same 1° of output steering is sin(46°)−sin(45°)=0.0122.

In one embodiment, the index of refraction of the optical waveguide 40 is modulated by forming the optical waveguide 40 from lithium niobate and using the electro-optic effect to change the index, such as by applying a single voltage thereto. For example, the change of refractive index, Δn, may be calculated using the following equation:

$$\Delta n = n_o^3 r_{22} (\Delta V/d) \qquad \text{Eq. 2}$$

where $n_o$ is the ordinary refractive index, $r_{22}$ is the appropriate electro-optic coefficient, ΔV is the voltage change, and d is the distance between electrodes. Using values for lithium niobate at 1064 nm, $n_o$=2.2323, r22=5.6×10-12 m/V, and assuming a small gap between electrodes of 10 µm, solving for ΔV gives ΔV=2800 V to get Δn=0.0175 (for 1° of beam steering).

In another embodiment, the index of refraction may be modulated by using a liquid crystal material, such as to form liquid crystal gratings. For example, various embodiments may use a special phase of highly chiral liquid crystals called a "blue phase" that has a periodic defect in the crystal structure with dimensions on the order of the wavelength of light. In this embodiment, a self-assembled diffraction grating for the planar antenna may be provided, while also allowing a modulation of the grating period.

In particular, the blue phases are tunable photonic crystals wherein the period of the defects may be changed with an applied voltage, thus changing the color of the Bragg reflected light. For example, the response is linear when an ac voltage in the range of 14 to 18 V/µm rms is applied thereto. That change in voltage gives a 13% change in defect period, causing the Bragg reflected light to change from orange (572 nm) to blue/green (506 nm). That same amount of grating period change in the planar antenna 22 (shown in FIG. 1) can steer the beam from 0° to 11° relative to the surface normal assuming a waveguide index of refraction of 1.5.

Thus, in various embodiments, the crystal structure of the blue phase liquid crystal is aligned to obtain the desired grating direction. It should be noted that one or more unwanted diffraction orders in other directions may be suppressed. Additionally, in some embodiments, using an AC field for liquid crystal manipulation, the field direction may switch periodically across the substrate by using interlaced electrodes.

It also should be noted that the blue phase is a three-dimensional photonic crystal that is different from the cholestefic phase, which is a one-dimensional photonic crystal. Cholesteric phase has a spiraling orientation of the molecules along one axis that gives a periodic birefringence variation, which may be used to obtain a self-assembled diffraction grating with a period that can be modulated (and avoids multiple diffracted modes). For these materials, an applied field can be used to change how tightly the helix is wound and thus give different periods of index variation.

There is also a flexoelectric effect in cholesteric phase materials that may be used to modulate Bragg reflection. In the flexoelectric effect, a uniformly applied electric field causes alternating bands of bend and splay deformations in the liquid crystal. These bands appear to be on a larger scale than the spiral twist of the liquid crystal, which provides another degree of freedom for achieving the desired grating period. It should be noted that the time scale for this effect is on the order of microseconds as opposed to the millisecond time scale of a conventional twisted nematic liquid crystal display.

Thus, in various embodiments, the effective period of the index of refraction is changed (instead of changing the period). For example, the type of material used, such as an LC material naturally orients into a periodic structure, wherein an applied voltage (which may be applied by electrodes over or on the surface of the substrate) morphs or changes the periodicity such that the index of refraction of the optical waveguide 40 may be changed. As another example, doping or photolithography techniques may be used to form a pattern within the substrate. For example, a photoresist technique as known in the art may be used to provide different doping (with layers formed on top thereof) or a physical corrugation may be provided using an etching process as known in the art.

In operation, the index of refraction in a waveguide may be modulated using different techniques, for example by applying a voltage as described herein. However, the various embodiments are merely exemplary and any method to modulate the index of refraction may be used. For example, one-dimensional photonic crystals may be formed from liquid crystal phases, which respond to applied fields to control orientations thereof.

It should be noted that in order to provide diffraction efficiency, in various embodiments the polarization is perpendicular to the plane containing the incident and diffracted wave vectors. In some embodiments, a polarization rotation between the two diffraction gratings 38 and 42 in the glass substrate 28 is provided. For example, a polarization rotating element may be provided between the two diffraction gratings 38 and 42.

Also, the gratings may be formed in other ways, such as holograms, acoustic waves, etc. Additionally, the grating coupling efficiency may be adjusted across the aperture to improve beam uniformity.

The various embodiments, including the planar antenna 22 may be used in different applications. For example, the planar antenna 22 may be used as a laser communication (lasercom) antenna. For example, while various embodiments include generating a transmit beam, a receive beam follows the same path in reverse, thereby allowing bidirectional communications from a single antenna, such as for cases that do not use a point ahead function. For example, as shown in FIG. 5 communication between a control station 50 (e.g., an aircraft control tower) and a mobile platform 52 (e.g., an aircraft) may be provided using the planar antenna 22 of one or more embodiments. It should be noted that the control station 50 and the mobile platform 56 may each include a controller 54 and 56, respectively, which may include a processor or other device for providing control signals to the planar antenna 22 as described in more detail herein to provide electronic beam steering.

For example, the planar antenna 22 in some embodiments provides optical antennas that may be mounted on different surfaces on an aircraft. By routing the optical signal to the antenna that is pointed in the desired direction, spherical field of regard may be provided with nearly conformal antennas. However, it should be noted that the various embodiments may be implemented in connection with any type of control station 50 and mobile platform 52, and is not limited to an aircraft application.

The various embodiments also may be used in non-communication applications, for example, in heads-up displays. The planar antenna 22 may be configured into a helmet-mounted cueing system by positioning one of the planar antennas 22 in front of each eye in a helmet. In operation, the planar optic may raster scan a beam into the eye and generate an image directly on the retina. Thus, a wearable computer display may be provided as a pair of computer controlled eyeglasses.

As another example, the various embodiments may be implemented as deployable large area optical collectors. An array of the planar antennas 22 may cover a large area while still being thin and light (similar to a solar array on a satellite). The alignment of the individual panels is not fixed as any pointing errors may be compensated with the electronic beam steering.

Thus, various embodiments provide a planar antenna having electronic beam steering, such as with dynamic gratings. For example, a method 60 for transmitting an optical signal is shown in FIG. 6. In particular, the method 60 includes coupling at 62 a fiber to a one-dimensional waveguide within an optical antenna substrate. The one-dimensional waveguide may be disposed within the substrate as described in more detail herein to receive an optical signal from the fiber. The method 60 also includes configuring the 1D waveguide at 64 to carry the optical signal along the substrate, for example, along a width of the substrate as described herein. For example, the waveguide may be operated to carry the optical signal along a linear path within the substrate to generate a one-dimensional optical signal.

The method 60 further includes coupling the one-dimensional optical signal to a two-dimensional waveguide at 66. For example, the one-dimensional optical signal may be coupled to a two-dimensional waveguide associated with the substrate using a diffraction grating as described herein to generate a two-dimensional optical signal along the length and width of the substrate. The method 60 additionally includes coupling the two-dimensional signal to free space at 68, such as using a diffraction grating as described herein.

Electronic beam steering of the optical signal may be provided at 70. For example, beam steering may be accomplished by changing the effective grating period of the two gratings. In one embodiment, the grating for the one-dimensional waveguide steers the beam in azimuth and the grating for the two-dimensional waveguide steers the beam in elevation.

It should be noted that the various embodiments may be implemented in hardware, software or a combination thereof. The various embodiments and/or components, for example; the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An optical planar antenna comprising:
    a linear waveguide within a substrate and having a fiber interface;
    a planar waveguide within the substrate;
    a first diffractive optical element configured to couple the linear waveguide to the planar waveguide; and
    a second diffractive optical element configured to couple the planar waveguide to free space,
    wherein the linear and planar waveguides are configured to enable independent modulation of a refractive index.

2. The optical planar antenna of claim 1, wherein the first diffractive optical element comprises a first diffraction grating adjacent the linear waveguide and extending along a width of the substrate.

3. The optical planar antenna of claim 2, wherein the first diffraction grating has a coupling ratio that increases along a travel direction of an optical signal within the planar waveguide.

4. The optical planar antenna of claim 1, wherein the second diffractive optical element comprises a second diffraction grating adjacent the planar waveguide.

5. The optical planar antenna of claim 4, wherein the second diffraction grating has a coupling ratio that increases along a travel direction of an optical signal within the planar waveguide.

6. The optical antenna of claim 1, wherein the first diffractive optical element comprises a first diffraction grating and the second diffractive optical element comprises a second diffraction grating, and a polarization rotating element between the first and second diffraction gratings.

7. The optical planar antenna of claim 1, wherein at least one of the first or second diffractive optical elements is formed from a material different than a material forming the substrate and at least one of the linear waveguide or the planar waveguide is formed from a material different than a material forming the substrate.

8. The optical planar antenna of claim 1, wherein at least one of the linear waveguide or the planar waveguide is formed from an electro-optic material.

9. The optical planar antenna of claim 1, wherein the first diffractive optical element is perpendicular to one side of the planar waveguide.

10. The optical planar antenna of claim 1, wherein at least one of the first or second diffractive optical elements is formed from a liquid crystal material or a cholesteric phase material.

11. The optical planar antenna of claim 1, wherein at least one of the first or second diffractive optical elements is configured to dynamically change a periodic disturbance within the substrate using a single voltage.

12. The optical planar antenna of claim 1, wherein at least one of the first or second diffractive optical elements is configured to minimize a diffraction efficiency of a second diffraction order via one of sine wave grating, blazed grating, or volume grating or to minimize one of a first diffraction orders via blazed grating, volume grating, or associated reflective layers.

13. An optical head for a laser communication system, the optical head comprising:
   an optical planar antenna including:
      a linear waveguide within a substrate having a fiber interface;
      a planar waveguide within the substrate;
      a first diffractive optical element configured to couple the linear waveguide to the planar waveguide; and
      a second diffractive optical element configured to couple the planar waveguide to free space; and
   a pivoting support mounted to the optical planar antenna configured to pivot the optical planar antenna.

14. The optical head of claim 13, wherein at least one of the first or second diffractive optical elements is configured to change a periodic disturbance of the first or second diffractive element using a single voltage.

15. The optical head of claim 13, wherein at least one of the linear or planar waveguides are configured to modulate an index of refraction thereof.

16. An optical planar antenna comprising:
   a linear waveguide within a substrate and having a fiber interface;
   a planar waveguide within the substrate;
   a first diffractive optical element configured to couple the linear waveguide to the planar waveguide, wherein the first diffractive optical element comprises a first diffraction grating adjacent the linear waveguide and extending along a width of the substrate, wherein the first diffraction grating has a coupling ratio that increases along a travel direction of an optical signal within the planar waveguide; and
   a second diffractive optical element configured to couple the planar waveguide to free space.

17. An optical planar antenna comprising:
   a linear waveguide within a substrate and having a fiber interface;
   a planar waveguide within the substrate;
   a first diffractive optical element configured to couple the linear waveguide to the planar waveguide; and
   a second diffractive optical element configured to couple the planar waveguide to free space, wherein the second diffractive optical element comprises a second diffraction grating adjacent the planar waveguide, wherein the second diffraction grating has a coupling ratio that increases along a travel direction of an optical signal within the planar waveguide.

18. An optical planar antenna comprising:
   a linear waveguide within a substrate and having a fiber interface;
   a planar waveguide within the substrate;
   a first diffractive optical element configured to couple the linear waveguide to the planar waveguide; and
   a second diffractive optical element configured to couple the planar waveguide to free space, wherein at least one of the first or second diffractive optical elements is configured to dynamically change a periodic disturbance within the substrate using a single voltage.

19. An optical planar antenna comprising:
   a linear waveguide within a substrate and having a fiber interface;
   a planar waveguide within the substrate;
   a first diffractive optical element configured to couple the linear waveguide to the planar waveguide; and
   a second diffractive optical element configured to couple the planar waveguide to free space, wherein at least one of the first or second diffractive optical elements is configured to minimize a diffraction efficiency of a second diffraction order via one of sine wave grating, blazed grating, or volume grating or to minimize one of a first diffraction orders via blazed grating, volume grating, or associated reflective layers.

* * * * *